Figure 1:
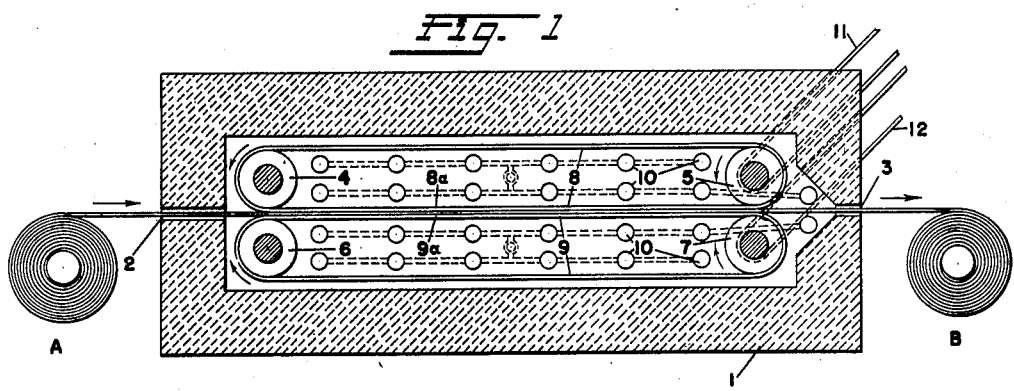

May 18, 1943 — R. W. COOK — 2,319,300
CONTACT STRIP ANNEALING FURNACE
Filed Sept. 8, 1939 — 4 Sheets-Sheet 1

Inventor
RAYMOND W. COOK

May 18, 1943.  R. W. COOK  2,319,300
CONTACT STRIP ANNEALING FURNACE
Filed Sept. 8, 1939  4 Sheets-Sheet 2

Inventor
RAYMOND W. COOK
By Samuel Scrivener Jr.
Attorney

May 18, 1943. R. W. COOK 2,319,300
CONTACT STRIP ANNEALING FURNACE
Filed Sept. 8, 1939 4 Sheets-Sheet 3
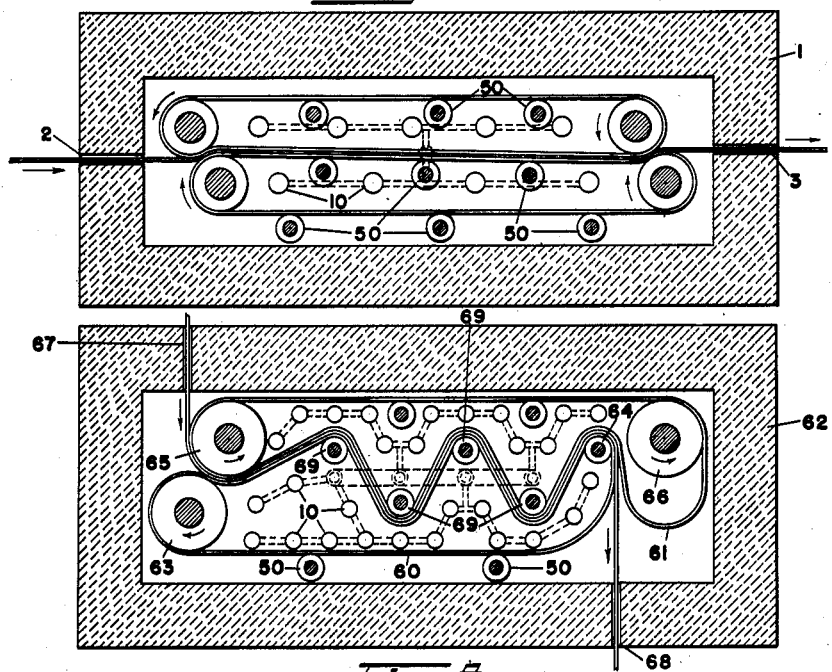
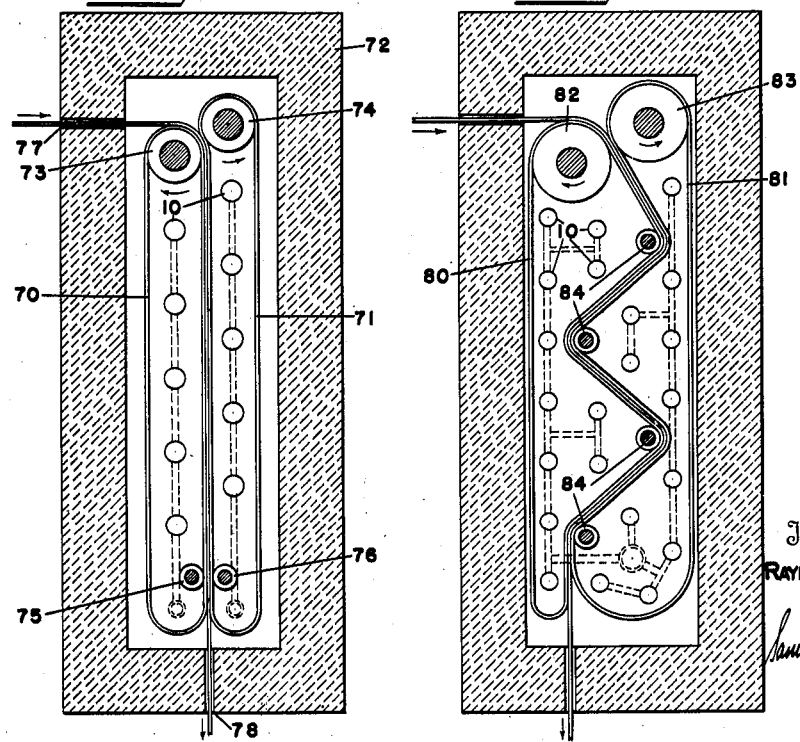

Inventor
RAYMOND W. COOK

Patented May 18, 1943

2,319,300

UNITED STATES PATENT OFFICE 2,319,300

CONTACT STRIP ANNEALING FURNACE

Raymond W. Cook, Bristol, Conn., assignor to Associated Spring Corporation, Bristol, Conn., a corporation of Delaware Application September 8, 1939, Serial No. 294,017

7 Claims. (Cl. 266—3)

This invention relates to the art of heat treating of metal and, more particularly, relates to the heat treating of sheet or strip metal by contact or conduction means.

It is the principal object of the invention to provide a new method and apparatus for heat treating strip or sheet metal, in the practise or use of which a moving metal strip is brought into contact, on one or both of its faces, with one or more moving belts of heated material, and is maintained in contact therewith throughout at least a portion of the travel of the belt thereby heating the strip to the desired temperature by contact with the heated belt.

Another object of the invention is to provide means for heating strip or sheet metal in which the strip is heated by passage between, and in contact with, two moving, heated endless belts.

Another object is to provide means for heating strip or sheet metal, in which the strip is passed around and in contact with a single heated endless belt.

A further object of the invention is to provide heating means of the type set forth, in which the strip is passed between the adjacent reaches of spaced pairs of heated endless belts, the speed of travel of which may be selectively and separately controlled to thereby permit the strip to be put under tension as it is treated.

A still further object of the invention is to provide driving means for moving either the metal strip or the heating belts, or both, and which may be operated to synchronize the rate of travel of the strip and the belts, and to cause either the strip or the belts to drive the other.

Other objects and features of novelty of the invention will be made apparent by the following description and the annexed drawings, it being clearly understood, however, that such description and drawings are merely illustrative of the invention, which is not limited in any way thereby or otherwise than by the appended claims.

Referring to the drawings, in which similar reference numerals refer to like parts, Figs. 1 to 12 illustrate furnaces, each including one form which may be taken by the heat treating means according to the present invention.

One of the principal developments in the art of heat treating of strip metal has been the increased use and the continued improvement of the so-called continuous heating furnace. In heating means of this type the strip metal is unwound from a coil, passed through the heating means, cooled and wound on a coil at the outlet end of the furnace. Various types of heating means, including those employing the principles of conduction, radiation and convection heating, have heretofore been employed in such heat treating means. The latter two methods have been well-explored and are similar in that the heat may be applied by any means or method, such as open flame, muffle, radiant tube or other known means. Contact or conduction heating means of various types have long been used in the heating of continuous strip material and, in the preferred and usual form, comprise a bath of molten salt or lead through which the strip metal is passed. Such conduction heating means are low in efficiency and are expensive to operate and maintain and, further, are objectionable because of the discoloration and deposit left on the treated strip by the material of the bath. In another type of conduction or contact heating means the metal strip is passed around and in contact with the periphery of a rotating drum, within which are located suitable heating means. Such devices are unsatisfactory because of the fact that they heat the strip on only one side thereof, and also because of the fact that in order to provide sufficient heating surface and internal space for burners, the drums must be made so large that they become impracticable and too expensive.

In the present invention I provide a new method and means for heat treating strip or sheet metal, employing the principle of heating by contact or conduction, and by which the objectionable features of prior contact heating devices are avoided. In carrying out my invention I cause a moving strip or sheet of metal which is to be treated to engage in face-to-face contact with one or more moving endless belts formed of steel, alloy steel, stainless steel or other heat-conducting and preferably metallic material, each of such belts being heated by suitable means and in turn, by contact, heating the strip metal. The contact between the strip metal and the heated endless belt is maintained throughout a part or substantially all of the length and travel of the endless belt and, in any case, throughout a sufficient extent to heat the strip to the desired temperature, and the speed of the belt and the strip are, preferably, so regulated as to cause the two to move at the same speed. Two endless heating belts having adjacent and closely spaced reaches may be provided, in which case the strip is passed between and in contact with adjacent reaches thereof, each face of the strip being in contact with one of the two belts. In another form of my invention only a single endless belt is provided and the strip is maintained in contact therewith throughout substantially the entire length of the belt. It will be seen that in this latter form of the invention, only one face of the strip will be in contact with the heating belt. The belts provided by this invention may be so arranged that the strip is passed through the furnace in a vertical, horizontal or inclined direction, as will be more fully set forth.

One form which my invention may take is illustrated in Fig. 1 of the drawings and, referring to this figure, it will be seen that I have provided a furnace comprising the insulated chamber 1 having inlet and outlet ports 2 and 3 at the opposite ends thereof. Within the chamber there are provided two pairs of rotatable rollers or pulleys, the pulleys 4, 5 of one pair being positioned, respectively, above the pulleys 6, 7 of the other pair. The pulleys 4 and 6 are positioned adjacent the inlet port 2 and the pulleys 5 and 7 are positioned adjacent the outlet port 3. Mounted on each pair of pulleys is an endless belt formed of steel, stainless steel, alloy steel or other suitable conducting and preferably metallic material, the belt on the upper pulleys 4, 5 being shown at 8 and that on the lower pulleys 6, 7 being shown at 9. These belts are formed of any suitable width and are preferably slightly wider than the strip metal which is to be treated. It will be seen that the mounting of the upper and lower belts on horizontally spaced rollers will cause the lower reach 8a of the upper belt to lie just above and in parallelism to the upper reach 9a of the lower belt, there being just sufficient space therebetween to accommodate the metal strip which is treated. In order to permit the treatment of strips of various thicknesses, the pulleys are preferably supported for vertical adjusting movement with respect to each other.

The strip metal to be treated may, as is usual in this art, be provided in coils, as indicated at A in Fig. 1, and such a coil may be rotatably supported outside of the chamber 1 adjacent the inlet port 2. Strip metal from the coil A is admitted into the furnace chamber through the inlet port 2, is passed between the adjacent reaches 8a and 9a of the endless belts, is led from the furnace chamber through the outlet port 3 and may be wound into a coil, illustrated at B, adjacent the outlet port. Obviously, the strip may be led from the outlet port 3 to any other desired heat treating or cooling means before being wound into a coil at B.

Means are provided by the invention for maintaining the endless belts 8, 9 at a suitable temperature, and this may be effected in various ways. For example, if the treated material is to have a bright finish, radiant tubes or electric heating elements may be positioned between the pulleys of each pair and within the endless belt mounted thereon, this permitting a suitable gaseous atmosphere to be maintained within the furnace chamber. If the finish of the treated material is not important, open firing by gas or other burners may be employed. For purpose of illustration only there are diagrammatically illustrated in the drawings a plurality of radiant tube heating elements 10 within each of the endless belts, it being clearly understood that the invention is not limited in any way to any particular form or type of means for heating the belts.

Means are also provided by the invention for moving the heated endless belts on their rollers and for moving the strip metal which is in contact therewith. The belts and the strip are preferably moved at the same speed, in order that every point of the strip will remain in contact with the same points of the belt or belts during its entire travel therewith. In embodiments, such as that illustrated in Fig. 1, in which the strip is passed between the adjacent reaches of two belts, the belts are, preferably, caused to move in such a manner that the adjacent reaches 8a and 9a, which engage the strip, move in the same direction as the strip. The movement of the endless belts and the strip may, according to the invention, be effected in various ways. In one method of operation the pulleys are driven by suitable means such as the belt driving means 11, 12 illustrated in Fig. 1, the strip being pulled in the direction of the arrows of Fig. 1 by reason of the frictional engagement between the opposite faces of the strip and the outer faces of the adjacent reaches 8a and 9a of the belts, no additional means being required to cause the strip to be unwound from coil A. In another method of operation means are provided, such as belt driving means, which cause the strip to be wound into a coil at B, thus unwinding the strip from coil A and pulling it through the furnace chamber, the frictional engagement between the strip and the two endless belts causing the belts to be moved. Any combination of driving means for the belts and strips may be provided, if desired or necessary. In the preferred manner of operation, both of the belts and the strip are caused to move at the same speed but, if desired, the strip may be moved at a speed which is slower or faster than the speed at which the two belts are moved. The belts may be driven at different speeds and, in one method of operation, only one belt is driven, the other being held against movement, thereby stretching the driven belt against the non-driven belt and improving the contact between the belts and the treated strip.

The operation of the invention will, it is believed, be made apparent to those skilled in the art by the foregoing description and the annexed drawing and no further, detailed description of operation is believed to be necessary. It will be seen, however, that, by reason of the provision of the endless belts having elongated, heated reaches, contact may be maintained between the strip and the belts throughout substantially the entire length of the furnace chamber, thereby increasing greatly the speed of the heating operation and consequently permitting a corresponding reduction in the length of the furnace. It will also be seen that each unheated portion of the strip will, as it first engages the endless belts, be engaged by a newly-heated portion of the belt, and that these portions of the strip and belts will remain in contact until the strip leaves the belts adjacent the outlet port of the furnace. During this entire travel the trip will receive heat directly from the belts with which it is in contact and, indirectly, from the heating means 10.

Figure 2:
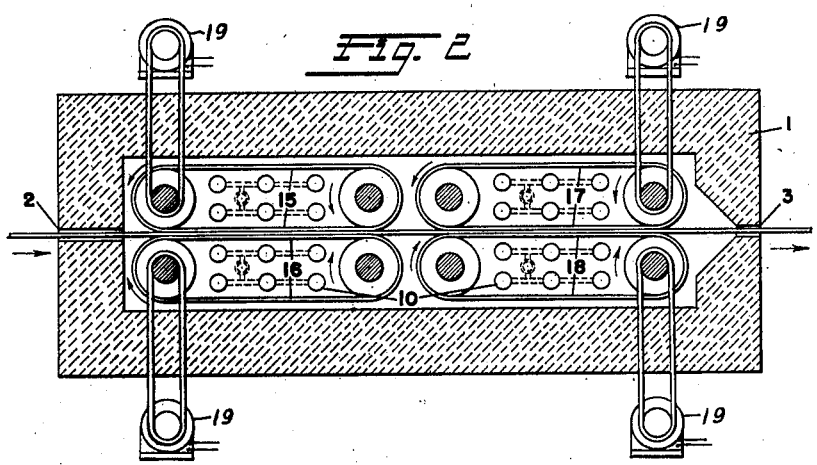

Means are provided by the invention for controlling the tension on the strip as it passes through the furnace and a preferred embodiment of the invention, including means for effecting this, is disclosed in Fig. 2 of the drawings. In this embodiment, instead of providing a single pair of endless belts as in the form illustrated in Fig. 1, there are provided two spaced pairs of endless belts each of which is similar to that illustrated in Fig. 1, and the strip is caused to pass successively between the adjacent reaches of these two pairs of belts. The combined lengths of these two pairs of belts may be approximately equal to the length of the single pair of belts disclosed in Fig. 1 and the two pairs of belts may be of unequal length, if desired. As illustrated in Fig. 2, there is provided one pair of belts, comprising an upper belt 15 and a lower belt 16, which is arranged adjacent the inlet port 2 of the furnace chamber and a second pair, comprising an upper belt 17 and a lower belt 18, which is arranged adjacent the outlet port 3, these pairs of belts being so positioned within the furnace that the treated strip may pass from one to the other as it moves from the inlet port 2 to the outlet port 3. The adjacent ends of the pairs of endless belts are positioned closely together in order to prevent dissipation of heat from the strip as it passes from one pair of belts to the next. In all respects except the number of pairs of heated belts the embodiment illustrated in Fig. 2 corresponds to that illustrated in Fig. 1. While all of the belts of the two pairs illustrated in Fig. 2 may obviously be moved at the same speed, I propose to move the belts 17, 18, which are positioned adjacent the outlet port, at a speed slightly in excess of that of the belts 15, 16, which are adjacent the inlet port, thereby placing the strip under tension and tending to flatten it. This may be done by differential operation of the motors 19 which are shown in Fig. 2.

Figure 3:
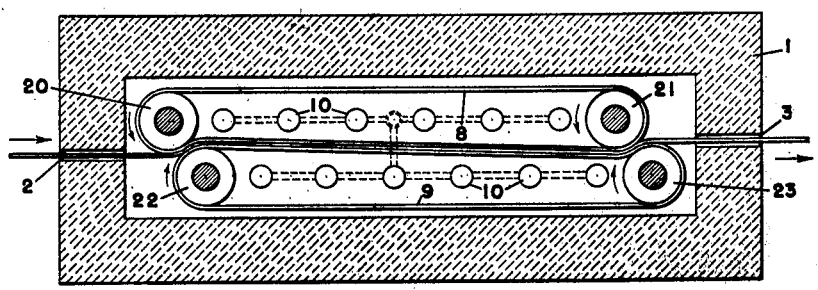

In another embodiment of my invention, which is illustrated in Fig. 3 of the drawings, the pulleys 20, 21, which support the upper belt 8, are offset with respect to the pulleys 22, 23 which support the lower belt 9, in the direction of the length of the strip and are also offset toward the rollers 22, 23. The treated strip is thus caused to bend slightly as it passes between the upper and lower pulleys at the inlet and outlet ends of the furnace and is lapped slightly around these pulleys. This bending of the strip has a definite flattening effect thereon and, further, the increased friction between the belts and the strip as these pass between the pulleys assists the driving member in moving the driven member, and also improves and maintains the contact between the strip and the belts. It will be apparent that the offsetting of the pulleys, as illustrated in Fig. 3, may be applied to the pulleys of a heating means as illustrated in Fig. 2.

Figure 4:
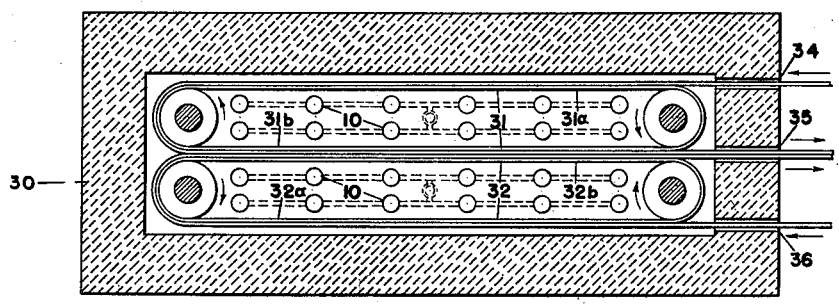

The capacity of a furnace as hereinbefore described may be increased by a somewhat different method of passing the strip through the furnace, and a modified form of the invention, employing such means, is disclosed in Fig. 4 of the drawings. In this embodiment there are provided the furnace chamber 30, within which are disposed the upper and lower endless belts 31, 32 and the heating means 10 therefor. At one end of the chamber there are provided three vertically spaced ports 34, 35, 36, the port 34 being positioned approximately at the level of the upper reach 31a of the upper belt 31, the port 35 being positioned approximately at the level of the adjacent lower and upper reaches 31b and 32b of the upper and lower belts, respectively, and the port 36, being positioned approximately at the level of the lower reach 32a of the lower belt 32. Two separate metal strips are caused to enter the furnace through the upper and lower inlet ports 34 and 36, respectively, and each strip is passed over the entire upper and lower reaches of one of the endless belts and is conducted from the furnace chamber through the central port 35. By reason of the fact that the strip is caused to enter and leave the furnace chamber at the same end thereof, substantially the full length of each endless belt will be constantly used as a heating means and each part of each strip will remain in contact with a heated belt during approximately the entire travel of the belt. The belts may therefore be moved at a higher speed than those of the embodiments hereinbefore described, thereby increasing the output of the furnace. It will be apparent that the vertical spacing between the pulleys at each end of the belts must be sufficient to permit the passage therebetween of the two belts and two thicknesses of metal strip.

Figure 5:
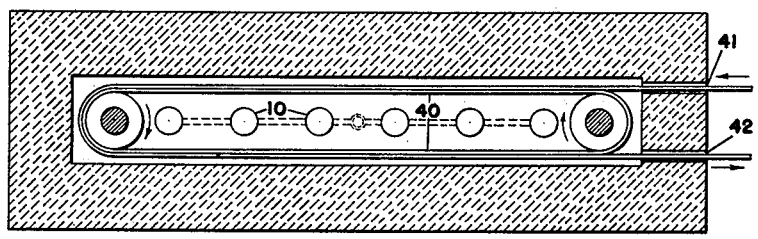
Figure 6:
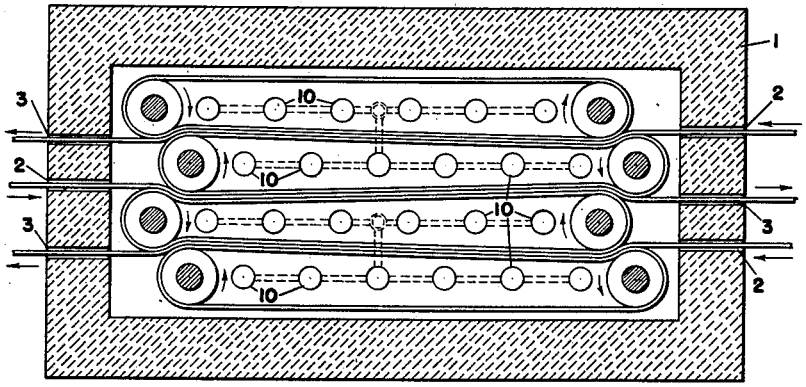

In Fig. 5 of the drawings there is disclosed an embodiment of the invention in which only a single endless belt 40 is employed, the metal strip being admitted to the furnace chamber through a port 41, passed over both reaches of the belt 40 and around one end thereof and conducted out of the chamber through a port 42 which is in the same end of the furnace chamber as the inlet port 41.

It will be apparent that more than two superposed endless belts may be arranged in a series, thereby permitting a plurality of metal strips to be heat-treated simultaneously. A furnace structure embodying such an assembly of belts is disclosed in Fig. 6 and it will be seen that this arrangement is substantially similar to that illustrated in Figs. 1 and 3 with the addition of one or more endless belts to provide a series of more than two superposed belts, thereby permitting the treatment of more than one metal strip at a time. As indicated in the drawings, alternate strips of material must be passed through the furnace in opposite directions because of the fact that the opposite reaches of the endless belts move in opposite directions. It will be apparent that a multiple-unit furnace of this type may embody the features illustrated in Figs. 1 and 2 of the drawings, or may be operated in the manner illustrated in Fig. 4.

In order to provide additional support for the reaches of the endless belts, thereby reducing the tendency of the belts to stretch, and assisting in maintaining proper contact between the belts and the heated strip, supporting idler rollers may be provided. A heat treating apparatus according to the present invention and including such idler rollers is disclosed in Fig. 7 of the drawings, a plurality of rollers 50 being disposed between the main pulleys which support and move the belts, and being so arranged that the upper surfaces thereof abut and support the reaches of the two endless belts. It will be apparent that such rollers may be employed with any embodiments of the invention.

Means are provided by the invention for increasing the effective heating length of the endless belt heating means without increasing the overall length of the furnace, and one form which may be taken by such means is disclosed in Fig. 8 of the drawings. As illustrated in this figure, two endless belts 60, 61 are provided within the furnace chamber 62, these belts being supported, respectively, by the pulleys 63, 64 and 65, 66. Between the pulleys 63, 65 which support the ends of the two belts adjacent the inlet port 67 and the pulleys 64, 66 which support the pulleys adjacent the outlet port 68 are a plurality of supplemental supporting rollers 69, these being arranged in an upper series and a lower series, as illustrated, or being arranged in any other suitable manner to provide a zig-zag path between successive rollers. Each of the two endless belts are trained about these rollers, being alternately led under and over successive rollers of the upper and lower series, to thereby cause each of the belts to follow a circuitous path which is of considerably greater length than the usual path which would be followed by the belts in passing directly between the main supporting pulleys. Heating means 10 are provided and are so disposed within the furnace chamber that all portions of the belts are heated. The metal strip is introduced between the belts as they pass between the rollers 63, 65 adjacent the inlet port and is maintained in close contactual relation with and between the belts, following the circuitous course thereof through the furnace, and passing from between the belts as the belts pass around the pulleys 64, 66 adjacet the outlet port. It will be apparent that the circuitous path followed by the belts and the strip may be made as long as desired by introducing more or fewer idler rollers 69 between the main supporting pulleys and that the overall length of the heat treating means may be reduced by increasing the lateral travel of the belts.

While the various forms of the invention hereinbefore disclosed have been described and illustrated as having the belts and strip arranged to move horizontally, it will be apparent that all of such embodiments may be so disposed that the belts and strip move in a vertical or inclined direction. One embodiment of my invention which is particularly adapted for vertical movement of the belts and the strip is illustrated in Fig. 9 of the drawings. In this embodiment two endless belts 70, 71 are provided, these being disposed in a furnace chamber 72, and each being supported therein by a single pulley, the belt 70 being supported by pulley 73 and the belt 71 being supported by pulley 74. No other pulley supporting means are provided and the belts hang downwardly from their respective pulleys, being maintained in proper positions by their weight. The pulleys 73, 74 are positioned at the upper part of the chamber and are so spaced with respect to each other that the belts may pass therebetween with sufficient spacing between the belts to accommodate a strip of metal. If desired, additional guide rollers 75, 76 may be positioned within the respective belts and adjacent the lower, free ends thereof in order to guide and insure the maintenance of the proper spacing between the belts. Heating means 10 are provided in the usual manner for heating the belts. Strip metal admitted into the chamber through the inlet port 77 is led between the heated belts at the point where these pass between the rollers 73, 74 and will pass from the belts at their lower, free ends, being guided from the chamber through the outlet port 78. The belts and the strip will, preferably, be moved at the same speed by the frictional engagement therebetween.

The effective heating length of the belts in a vertically-arranged furnace may be increased by the same means as are disclosed in Fig. 8, and in Fig. 10 of the drawings there is disclosed a heat treating apparatus in which the belts 80, 81 depend from the pulleys 82, 83, respectively, in the manner described in connection with Fig. 9. The adjacent, facing, spaced portions of the depending belts, which form the strip heating surfaces, are trained over idler rollers 84 which are arranged in a zig-zag line extending downwardly from the supporting pulleys 82, 83, thereby causing the belts and strip to follow a circuitous path and also causing improved contact to exist between the belts and the metal strip which is maintained therebetween. Heating means 10, of the type described hereinbefore are provided, and it is also contemplated that the belts and strip be synchronously moved in the manner set forth hereinbefore.

Figure 11:
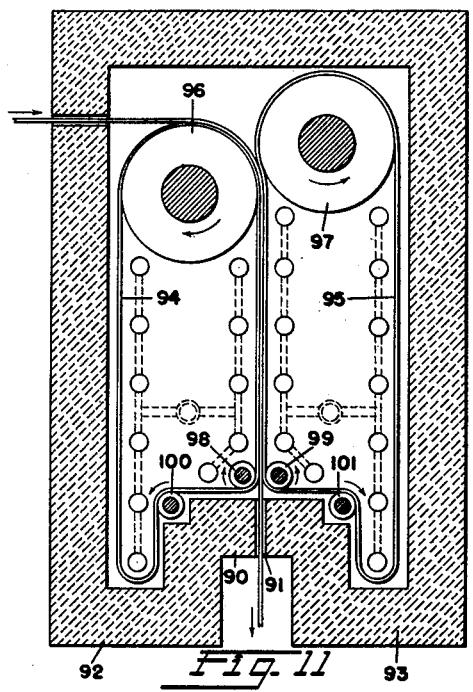

In the use of heat treating means according to the invention in which the belts depend vertically from supporting pulleys, as in the embodiments disclosed in Figs. 9 and 10, it may be found that the belts, when heated, will be stretched by the weight thereof, there being less support for the belts in these forms of the invention than in those forms in which the belts and strip are moved horizontally. This effect may be reduced by the addition to the belt of some non-stretchable reinforcing material, or by forming the belt of some material or of such dimensions as will reduce the stretching effect. In a modified form of the invention disclosed in Figs. 9 and 10, the furnace chamber is formed to provide receptacles within which any slack due to stretching of the belts is received, this furnace construction being also adapted to deflect the belts away from the strip adjacent the outlet port of the furnace chamber. Such a structure is illustrated in Fig. 11 of the drawings, wherein it will be seen that the bottom of the furnace chamber is provided with a central, raised portion 90, within which is formed the outlet port 91, and two wells 92, 93, one at each side of the raised portion 90. Heating belts 94, 95 are disposed within the chamber and depend from rollers 96, 97. Idler rollers 98, 99 are positioned, respectively, within the two belts and adjacent the outlet port 91 and idler rollers 100, 101 are positioned, respectively, outside of the two belts below the rollers 98, 99. The belts are guided under rollers 98, 99 and over rollers 100, 101, thereby being led over the wells 92, 93 whereby any increased length of the belts, due to stretching thereof, will be received in the wells and will not come into contact with the strip at the lower part of the chamber.

Figure 12:
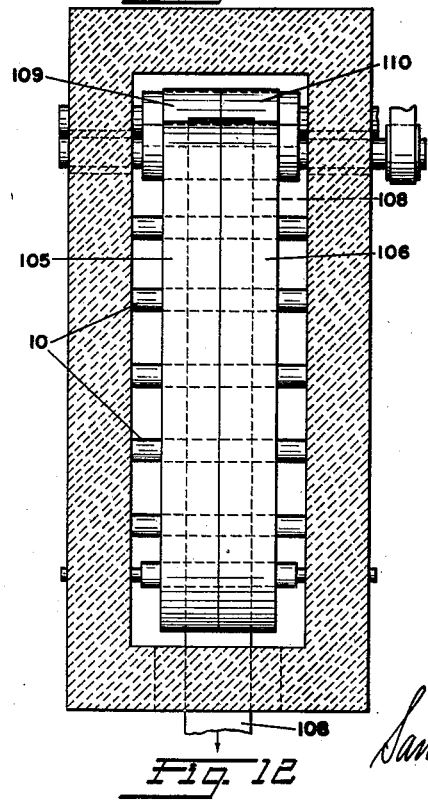

Means are provided by the invention for differentially heating the two longitudinal sides or edges of a strip of metal, and this may be effected by the means disclosed in Fig. 12 of the drawings. In this figure there is illustrated the plan view of a heat treating apparatus according to the invention. In this embodiment two heating belts 105, 106 are arranged side by side, being trained over the pulley 107, the strip of metal 108 being maintained in face-to-face contact with the belts in the manner hereinbefore described, and a second pair of belts 109, 110 may be disposed in contactual relation to the opposite face of the metal strip, if desired. The longitudinal side edges of the metal strip 108 may overlap the belts 105, 106 in any desired proportion in order to heat different portions of the belt to different temperatures.

While I have illustrated various forms which my invention may take, it will be apparent to those skilled in the art that other embodiments of the invention may be made and that improvements and changes may be made therein, all without departing in any way from the spirit or scope of the invention, for the limits of which reference must be had to the appended claims.

I claim:

1. An apparatus for heat treating strip metal, comprising a furnace chamber, a pair of rotatable pulleys within the furnace chamber, an endless imperforate metallic belt mounted thereon and being entirely within the furnace chamber, a second pair of rotatable pulleys within the furnace chamber, a second endless imperforate metallic belt mounted on the second pair of pulleys and being entirely within the furnace chamber, said pairs of pulleys being so positioned and spaced that portions of said belts between the pulleys on which they are respectively mounted are in opposed parallel relation to each other and are spaced apart sufficiently to receive a strip of metal therebetween with the opposite faces of the strip in contact with said opposed parallel portions of the endless belts, and means within the furnace chamber for heating said belts.

2. An apparatus for heat treating strip metal, comprising a furnace chamber, a plurality of movable endless imperforate metallic belts which are disposed entirely within the furnace chamber and have opposed parallel portions lying in face-to-face relation and spaced apart sufficiently to receive therebetween a metal strip having its opposite faces in contactual engagement with the opposed parallel portions of the endless belts, means within the furnace chamber for heating said belts, and means for causing longitudinal movement of at least one of the opposed parallel portions of the belts and the metallic strip received therebetween.

3. An apparatus for heat treating a strip of metal, comprising a pair of endless metallic belts which are movably mounted and arranged to present elongated, parallel portions thereof lying in opposed, face-to-face relation and spaced sufficiently to receive therebetween a strip of metal having its opposite faces in face-to-face contact with the opposed, elongated portions of the metallic belts, a second pair of endless metallic belts which are substantially identical in structure and arrangement with those of the first pair, said second pair of belts being spaced from the first pair in the direction of movement of the treated metal strip, and means for heating each of said metallic belts.

4. An apparatus for heat treating strip metal according to claim 3, comprising in addition, means for moving the belts of the first-named pair, and means for moving the belts of the second-named pair at a speed greater than that of the belts of the first-named pair.

5. A heat treating apparatus according to claim 1, in which each of the pulleys supporting one of said endless belts is positioned adjacent one of the pulleys supporting another of said endless belts and is so positioned with respect thereto as to cause the metal strip to be bent when passed therebetween.

6. A heat treating apparatus according to claim 1, in which each of the pulleys supporting one of said endless belts is positioned adjacent one of the pulleys supporting another of said endless belts and is offset from the adjacent pulley for the second belt in the direction of the length of the parallel portions of the belts and also toward the axis of the adjacent pulley whereby the metal strip is bent when passed therebetween.

7. An apparatus for heat treating strip metal, comprising a furnace chamber, two adjacent rotatable pulleys within the furnace chamber, an endless belt trained over each of said pulleys and depending therefrom and being entirely within the furnace chamber, said pulleys being so disposed with respect to each other that depending portions of said endless belts are in opposed, face-to-face, parallel relation and spaced sufficiently to receive a strip of metal therebetween in face-to-face contact with the faces of said depending portions, means within the furnace chamber for heating said belts, and means for causing longitudinal movement of at least one of the opposed parallel portions of the belts and the metallic strip received therebetween.

RAYMOND W. COOK.